Oct. 15, 1963     J. S. GALLO     3,106,802
PINE CONE HOLDER
Filed Aug. 27, 1962

JOSEPH S. GALLO
INVENTOR

BY Maxwell Fish
Atty.

United States Patent Office 3,106,802
Patented Oct. 15, 1963

3,106,802
PINE CONE HOLDER
Joseph S. Gallo, 938 East St., Walpole, Mass.
Filed Aug. 27, 1962, Ser. No. 219,653
1 Claim. (Cl. 47—55)

The present invention relates to a pine cone holder.

Because of the peculiarities in the structure of a pine cone which consists essentially of a mass of pollen-bearing scales arranged in pyramidal form about a central axis, no very satisfactory way has been found up to the present time to support such cones for use in wreaths and in floral decorations generally. Normally the cone is bound to a stick-type support by means of a thread which is slipped inwardly between the scale layers of the cone. This operation is time consuming and expensive.

It is a principal object of the invention to provide a novel and improved pine cone holder which is simple in construction and which is readily and quickly applied to hold the cone firmly in position without injuriously affecting the appearance of the cone.

With this and other objects in view as may hereinafter appear, the several features of the invention will be readily understood by one skilled in the art from the following description taken in connection with the accompanying drawings, in which.

Figure 1:
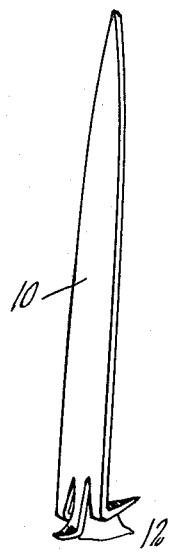
FIG. 1 is a perspective view of a cone holder in accordance with the invention.
Figure 2:
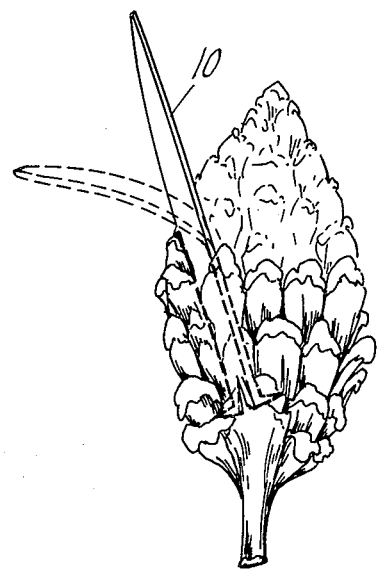
FIG. 2 is a perspective view of a pine cone showing the holder in position.
Figure 4:
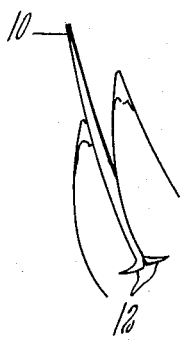
FIG. 4 is a side view of substantially the parts shown in FIG. 3.
Figure 3:
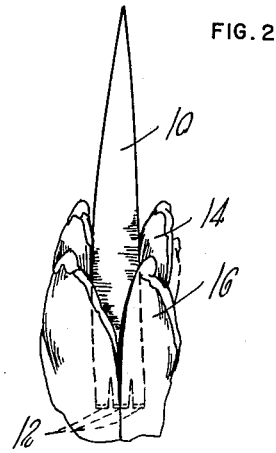
FIG. 3 is an enlarged detail view showing the manner in which the holder is inserted between and is gripped by adjacent scale layers of the cone.

Referring to the drawings the pine cone holder which forms the subject matter of the invention comprises a flat strip 10 tapered to a point at one end and having the other or base end formed with three prongs 12, the two outer prongs being bent at right angles to the base in one direction and the middle prong being bent at right angles to the base in the opposite direction. The holder 10 may take the form of a stamping preferably of a soft metal chosen of sufficient strength to insure that the prongs will bite into and grip the scales of a pine cone, and at the same time sufficiently soft to permit the stem of the holder to be bent readily to any desired angle as shown in FIG. 2 or to be wrapped about the core element of a wreath.

A pine cone is mounted on the holder 10 in the following manner:

Two adjacent scale layers 14 and 16 of a pine cone 18 are forced apart and the base end of the holder 10 having the prongs 12 is forced inwardly as far as possible toward the base of the scales. The scale layers 14 and 16 are then pressed together causing the teeth to bite into the cone. The cone stem, as the combination is called, is now ready for use, and may, for example, be stuck into the foam plastic foundation of a floral decoration, or may be twisted about the core member of a wreath in order to assemble the cone therewith.

The cone holder 10 assembled with a cone in the manner above described has been found to provide an exceptionally stable and long-lasting support for the cone which is highly resistant to accidental bumps and shocks of moving, and is unaffected by the drying out of the cone. The relatively broad base of the holder projecting into the cone and the consequent lateral spacing of the prongs 12 which are enabled to bite into portions of said scales spaced laterally by a substantial amount causes the cone to be firmly held from twisting or tipping in any direction. The holder above described has the very great advantage that an absolute minimum of time and skill are required to assemble a cone and holder and for thereafter mounting the assembled cone stem with other elements of a floral decoration or wreath as may be desired.

The invention having been described what is claimed is:

A pine cone holder adapted to engage and support a pine cone rigidly in position on said holder for fastening into wreaths and like floral decorations, which comprises a tapered flat stem of a bendable soft metal material having at the base end thereof prongs which extend perpendicularly outwardly from each side of said flat stem, including two prongs spaced from one another at one side of said stem and a prong at the other side of said stem, said stem being adapted for penetrating attachment and for entwining attachment to such floral decorations, said prongs having outwardly projecting points which when projected between adjacent layers of scales of said cone, bite into said adjacent scale layers when the same are pressed toward one another to their original positions.

References Cited in the file of this patent
UNITED STATES PATENTS

| | | |
|---|---|---|
| 1,404,760 | Hardy | Jan. 31, 1922 |
| 2,595,577 | Harris | May 6, 1952 |